(12) United States Patent
Conner et al.

(10) Patent No.: US 7,524,905 B2
(45) Date of Patent: Apr. 28, 2009

(54) SUBSTANTIALLY LINEAR COPOLYMERS AND METHODS OF MAKING THE SAME

(75) Inventors: David M. Conner, Bethlehem, PA (US); Brian Leslie Goodall, Seattle, WA (US); Lester Howard McIntosh, III, Green Lane, PA (US)

(73) Assignee: Rohm and Haas Company, Philadephia, PA (US)

( * ) Notice: Subject to any disclaimer, the term of this patent is extended or adjusted under 35 U.S.C. 154(b) by 0 days.

(21) Appl. No.: 12/070,639

(22) Filed: Feb. 20, 2008

(65) Prior Publication Data

US 2008/0207854 A1 Aug. 28, 2008

Related U.S. Application Data

(60) Provisional application No. 60/891,989, filed on Feb. 28, 2007.

(51) Int. Cl.
C08F 4/06 (2006.01)
B01J 31/18 (2006.01)

(52) U.S. Cl. ............... 526/145; 526/160; 526/169; 526/172; 526/263; 526/264; 526/307.8; 526/348.8; 502/155

(58) Field of Classification Search .............. 526/145, 526/160, 169.1, 172, 263, 264, 307.8, 348.8; 502/155
See application file for complete search history.

(56) References Cited

U.S. PATENT DOCUMENTS

| | | | |
|---|---|---|---|
| 4,689,437 A | 8/1987 | Murray | |
| 4,698,403 A * | 10/1987 | Klabunde | 526/126 |
| 6,060,569 A | 5/2000 | Bennett et al. | |
| 6,417,303 B1 | 7/2002 | Stibrany et al. | |
| 7,129,292 B1 * | 10/2006 | Kristen et al. | 524/804 |
| 2002/0037982 A1 | 3/2002 | Johnson et al. | |

FOREIGN PATENT DOCUMENTS

| | | |
|---|---|---|
| DE | 10028540 A1 * | 12/2001 |
| EP | 0 280 380 B1 | 8/1988 |
| EP | 0 589 527 B1 | 3/1994 |
| EP | 1 508 577 A1 | 2/2005 |
| EP | 1693105 A1 | 8/2006 |
| EP | 1728553 A2 | 12/2006 |
| WO | WO 00/06615 A1 | 2/2000 |

OTHER PUBLICATIONS

Meking et al: Mechanistic Studies of The Palladium-Catalyzed . . . , Journal of the American Chemical Society, American Chemical Society, vol. 120, Jan. 27, 1998, pp. 888-899.
Popeney C et al: "Ligand Electronic Effects On Late Transition Metal Polymerization Catalysts", Organometallics, ACS, vol. 24, No. 6, Mar. 14, 2005, pp. 1145-1155.
Hearley A K et al: "New Single-Site Palladium Catalysts For The Nonalternating . . . ", Organometallics, ACS, vol. 24, No. 11, May 23, 2005, pp. 2755-2763.
Drent,et al, Palladium catalysed copolymerization of ethene with alkylacrylates:polar commonomer built into the linear polymer chain,Chem.Commun.pp. 744-745 (2002).
Schultz et al., Palladium(II)Complexes with Chelating P,O-Ligands as Catalysts for the Heck Reaction, Synthesis No. 6, pp. 1005-1011 (2005).
Katho,et al., Formation and Solid State Structures of Highly Crystalline Guanidinium Salts of Sulfonated Tertiary Phosphanes, Adv. Synth,Catal.No. 3/4,pp. 278-282 (2002).
Genet, et al., Recent developments of palladium(0) catalyzed reactions in aqueous medium, J. Organometallic Chemistry, vol. 576, Issues 1 2 pp. 305-317 (1999).

* cited by examiner

*Primary Examiner*—Helen L. Pezzuto
(74) *Attorney, Agent, or Firm*—Thomas S. Deibert

(57) ABSTRACT

Substantially linear copolymers derived from at least one acyclic aliphatic olefin monomer and at least one nitrogen containing vinyl monomer, wherein the at least one nitrogen containing vinyl monomer is according to Formula (I)

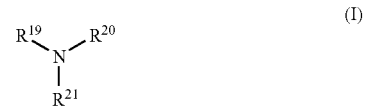

(I)

wherein $R^{19}$ is selected —C=C; and —C(O)—C=C; wherein $R^{20}$ and $R^{21}$ are independently selected from H, an alkyl group, an alkenyl group, an alkynyl group, an aryl group, a biphenyl group, a carboxylate group, a carboxyalkyl group, a carboxyarylalkyl group, an alkoxy group, an alkenyloxy group, an alkynyloxy group, an aryloxy group, an alkoxycarbonyl group, and derivatives thereof. Also disclosed are methods of making such copolymers using late transition metal catalyst complexes.

7 Claims, No Drawings

SUBSTANTIALLY LINEAR COPOLYMERS AND METHODS OF MAKING THE SAME

This application claims the benefit of priority under 35 U.S.C. §119(e) of Provisional Patent Application 60/891,989 filed on Feb. 28, 2007.

This invention was made with United States Government support under ATP Award No. 70NANB4H3014 awarded by the National Institute of Standards and Technology (NIST). The United States Government has certain rights in the invention.

The present invention relates to substantially linear copolymers derived from at least one acyclic aliphatic olefin monomer and at least one nitrogen containing vinyl monomer, wherein the at least one nitrogen containing vinyl monomer is according to Formula (I)

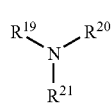

(I)

wherein $R^{19}$ is selected from —C=C, and —C(O)—C=C; wherein $R^{20}$ and $R^{21}$ are independently selected from H, an alkyl group, an alkenyl group, an alkynyl group, an aryl group, a biphenyl group, a carboxylate group, a carboxyalkyl group, a carboxyarylalkyl group, an alkoxy group, an alkenyloxy group, an alkynyloxy group, an aryloxy group, an alkoxycarbonyl group, and derivatives thereof. The invention also relates to processing for making such copolymers.

Commercial processes for the copolymerization of ethylene with polar monomers employ free radical processes in which the incorporation of the polar functionality is relatively random. The use of free radical initiators give little or no control over polymer architecture (tacticity or crystallinity, blockiness, polymer linearity and branching, molecular weight, and molecular weight distribution) and thus limits the accessible range of materials properties. Because these free radical processes require extreme pressures, they are associated with high capital investment and manufacturing costs, and, of course, increased safety concerns.

There is a need for new molecular catalysts capable of copolymerizing acyclic aliphatic olefins with various polar monomers under mild reaction conditions to afford substantially linear polymers and in a stereoregular ("tactic") fashion. Of the many approaches to modifying the properties of a polymer that are available, the incorporation of functional groups into an otherwise non-polar material is of paramount importance. Polar groups exercise control over important polymer properties such as toughness, adhesion, barrier properties, and surface properties. These polymer properties manifest themselves in the properties of materials incorporating the polymer, such as solvent resistance, miscibility with other polymers, and rheological properties, leading to product performance such as paintability, printability, gloss, hardness, and mar resistance. By incorporating polar groups into hydrocarbon polymers such as polyethylene, polypropylene and polystyrene, not only would the important properties related to crystallinity (modulus, strength, solvent resistance, etc.) be maintained, but new properties would also be expressed.

One method of making the copolymers is disclosed in U.S. Pat. No. 6,417,303 to Stibrany et al. Stibrany et al. disclose copolymers formed using a metal complex having the formula $LMX_1X_2$; wherein L is a bidentate nitrogen-containing ligand with more than 2 nitrogens; M is copper, silver or gold; $X_1$ and $X_2$ are independently selected from the group consisting of halogens, hydride, triflate, acetate, trifluoroacetate, perfluorotetraphenylborate, tetrafluoroborate, $C_1$-$C_{12}$ alkyl, $C_1$-$C_{12}$ alkoxy, $C_3$-$C_{12}$ cycloalkyl, $C_3$-$C_{12}$ cycloalkoxy, aryl, and any other moiety into which a monomer can insert. Stibrany et al. further disclose that the copolymers may have segments formed from olefinic monomers and monomers having at least one hydrocarbyl polar functional group.

Another method of making copolymers is disclosed in European Patent Number EP 0 589 527 to Drent et al. Drent et al. disclose a group of palladium catalyst complexes comprising a palladium metal center complexed with an anion derived from an acid having a $pK_a$ of less than 3, and containing an atom of Group VA of the Periodic Table of Elements, wherein the Group VA atom is substituted with at least one aryl group, said aryl group being substituted with a polar group on the ortho position. Drent et al. further disclose copolymers of ethylene with acrylates or vinyl acetate prepared using the palladium catalyst complexes disclosed in European Patent Number EP 0 589 527. (See Drent, et al., *Palladium catalysed copolymerization of ethene with alkylacrylates: polar comonomer built into the linear polymer chain*, CHEM. COMMUN., pp. 744-745 (2002)).

Notwithstanding, there remains a need for substantially linear copolymers derived from acyclic aliphatic olefins with other polar monomers and for methods of making the same.

In one aspect of the present invention, there is provided a process for preparing a copolymer comprising contacting at least one acyclic aliphatic olefin monomer, at least one nitrogen containing vinyl monomer, wherein the at least one nitrogen containing vinyl monomer is according to Formula (I)

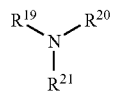

(I)

and a catalyst composition comprising a metal center, M, complexed with at least one ligand, wherein the at least one ligand has a structure according to Formula (II)

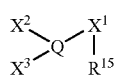

(II)

wherein $R^{19}$ is selected from —C=C, and —C(O)—C=C; wherein $R^{20}$ and $R^{21}$ are independently selected from H, an alkyl group, an alkenyl group, an alkynyl group, an aryl group, a biphenyl group, a carboxylate group, a carboxyalkyl group, a carboxyarylalkyl group, an alkoxy group, an alkenyloxy group, an alkynyloxy group, an aryloxy group, an alkoxycarbonyl group, and derivatives thereof; and, wherein $R^{20}$ and $R^{21}$ may optionally be combined to form a cyclic or multi-cyclic structure; wherein M is selected from Ni and Pd; wherein $X^1$, $X^2$ and $X^3$ are independently selected from a hydrocarbyl group, an aromatic hydrocarbyl group and derivatives thereof; wherein Q is selected from phosphorus and arsenic; wherein $R^{15}$ is selected from —$SO_3$, —$PO_3$, —$AsO_3$, and —$C(CF_3)_2O$; wherein the copolymer comprises 1 to 99.9 mol % acyclic aliphatic olefin monomer units; with the proviso that $R^{20}$ and $R^{21}$ are not both H and with the proviso that the at least one nitrogen containing vinyl monomer is not N-vinylimidazole.

In another aspect of the present invention, there is provided a process for preparing a copolymer comprising contacting at least one acyclic aliphatic olefin monomer, at least one nitrogen containing vinyl monomer and a catalyst composition comprising a metal center, M, complexed with at least one ligand, wherein the at least one ligand has a structure according to Formula (II)

wherein M is selected from Ni and Pd; wherein $X^1$, $X^2$ and $X^3$ are independently selected from a hydrocarbyl group, an aromatic hydrocarbyl group and derivatives thereof; wherein Q is selected from phosphorus and arsenic; wherein $R^{15}$ is selected from $-SO_3$, $-PO_3$, $-AsO_3$, and $-C(CF_3)_2O$; wherein the at least one nitrogen containing vinyl monomer is selected from N-vinylformamide; N-vinylacetamide; N-vinylphthalimide; N-methylvinylacetamide; N-vinylcaprolactam; 5-ethyl-5-methyl-3-vinylhydantoin; N-vinylpyrrolidone; 5-methyl-5-phenyl-3-vinylhydantoin; N-vinylcarbazole; N,N-dimethyl acryl amide; and 5-pentamethylene-3-vinylhydantoin; and, wherein the copolymer comprises 1 to 99.9 mol % acyclic aliphatic olefin monomer units.

The term "copolymer" as used herein and in the appended claims refers to polymers prepared from at least two different monomers.

The term "labile neutral electron donor ligand" as used herein and in the appended claims refers to any ligand that is not strongly bound to the metal center, M, such that it is easily displaced from the metal center; and when separated from the metal center in its closed shell electron configuration exhibits a neutral charge.

In some embodiments of the present invention, the at least one nitrogen containing vinyl monomer is selected from monomers according to Formula (I)

wherein $R^{19}$ is selected from $-C=C$, and $-C(O)-C=C$; $R^{20}$ and $R^{21}$ are independently selected from H, an alkyl group, an alkenyl group, an alkynyl group, an aryl group, a biphenyl group, a carboxylate group, a carboxyalkyl group, a carboxyarylalkyl group, an alkoxy group, an alkenyloxy group, an alkynyloxy group, an aryloxy group, an alkoxycarbonyl group, and derivatives thereof; wherein $R^{20}$ and $R^{21}$ may optionally be combined to form a cyclic or multi-cyclic structure; and with the proviso that $R^{20}$ and $R^{21}$ are not both H and with the proviso that the at least one nitrogen containing vinyl monomer is not N-vinylimidazole. In some aspects of these embodiments, $R^{20}$ and $R^{21}$ are independently selected from H, a $C_{1-20}$ alkyl group, a $C_{2-20}$ alkenyl group, a $C_{2-20}$ alkynyl group, an aryl group, a biphenyl group, a $C_{1-20}$ carboxylate group, a $C_{1-20}$ carboxyalkyl group, a $C_{1-20}$ carboxyarylalkyl group, a $C_{1-20}$ alkoxy group, a $C_{2-20}$ alkenyloxy group, a $C_{2-20}$ alkynyloxy group, an aryloxy group, a $C_{2-20}$ alkoxycarbonyl group, and derivatives thereof. In some aspects of these embodiments, $R^{20}$ and $R^{21}$ are independently selected from H, a $C_{1-20}$ alkyl group and a $C_{1-20}$ carboxyalkyl group. In some aspects of these embodiments, $R^{20}$ and $R^{21}$ are independently selected from H and a $C_{1-20}$ alkyl group.

In some embodiments of the present invention, the at least one nitrogen containing vinyl monomer is selected from N-vinylformamide; N-vinylacetamide; N-vinylphthalimide; N-methylvinylacetamide; N-vinylcaprolactam; 5-ethyl-5-methyl-3-vinylhydantoin; N-vinylpyrrolidone; 5-methyl-5-phenyl-3-vinylhydantoin; N-vinylcarbazole; N,N-dimethyl acrylamide; 5-pentamethylene-3-vinylhydantoin; and combinations thereof.

In some embodiments of the present invention, the at least one nitrogen containing vinyl monomer is selected from monomers according to Formula (I) wherein $R^{19}$ is $-C=C$, and $R^{20}$ and $R^{21}$ combine to form a cyclic or multi-cyclic structure. In some aspects of these embodiments, the at least one nitrogen containing vinyl monomer is selected from N-vinyldihydrocarbylamines. In some aspects of these embodiments, the at least one nitrogen containing vinyl monomer is selected from N-vinylcarbazole and N-vinylphthalimide.

In some embodiments of the present invention, the at least one nitrogen containing vinyl monomer is selected from monomers according to Formula (I) wherein $R^{19}$ is $-C=C$; $R^{20}$ is a carboxyalkyl group, preferably a $C_{1-20}$ carboxyalkyl group, more preferably a $C_{1-3}$ carboxyalkyl group; and $R^{21}$ is selected from an alkyl group, preferably a $C_{1-20}$ alkyl group; more preferably a $C_{1-3}$ alkyl group. In some aspects of these embodiments, $R^{20}$ and $R^{21}$ may optionally be combined to form a cyclic or multi-cyclic structure. In some aspects of these embodiments, the at least one nitrogen containing vinyl monomer is selected from vinylacetamides. In some aspects of these embodiments, the at least one nitrogen containing vinyl monomer is selected from N-vinylpyrrolidone, N-methylvinylacetamide and N-vinylcaprolactam.

In some embodiments of the present invention, the at least one nitrogen containing vinyl monomer is selected from monomers according to Formula (I) wherein $R^{19}$ is $-C(O)-C=C$. In some aspects of these embodiments, the at least one nitrogen containing vinyl monomer is an acrylamide.

In some embodiments of the present invention, M is selected from Ni and Pd. In some aspects of these embodiments, M is Ni. In some aspects of these embodiments, M is Pd.

In some embodiments of the present invention, Q is selected from phosphorus and arsenic. In some aspects of these embodiments, Q is phosphorus. In some aspects of these embodiments, Q is arsenic.

In some embodiments of the present invention, $R^{15}$ is selected from $-SO_3$, $-PO_3$, $-AsO_3$, and $-C(CF_3)_2O$. In some aspects of these embodiments, $R^{15}$ is $-SO_3$.

In some embodiments of the present invention, $X^1$, $X^2$ and $X^3$ are all different.

In some embodiments of the present invention, $X^2$ and $X^3$ are the same.

In some embodiments of the present invention, $X^1$, $X^2$ and $X^3$ are independently selected from aliphatic hydrocarbyl groups and aromatic hydrocarbyl groups. In some aspects of these embodiments, $X^1$, $X^2$ and $X^3$ are independently selected from aliphatic hydrocarbyl groups and aromatic hydrocarbyl groups having up to 30 carbon atoms. In some aspects of these embodiments, $X^1$, $X^2$ and $X^3$ are independently selected from alkyl, cycloalkyl, alkenyl, alkynyl, aryl, arylalkyl, alkylaryl, phenyl, biphenyl, carboxylate, alkoxy, alkenyloxy, alkynyloxy, aryloxy, alkoxycarbonyl, alkylthio, alkylsulfonyl, alkylsulfinyl, silyl, and derivatives thereof. In some aspects of these embodiments, $X^1$, $X^2$ and $X^3$ are independently selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C^1$-$C_{20}$ alkylthio, $C_1$-$C_{20}$ alkylsulfonyl, $C_1$-$C_{20}$ alkylsulfinyl, silyl, and derivatives thereof.

In some embodiments of the present invention, $X^2$ and $X^3$ are independently selected from aryl groups with an ortho substituted phenyl. In some aspects of these embodiments, $X^2$ and $X^3$ are independently selected from aryl groups with an ortho substituted, substituted phenyl. In some aspects of these embodiments, $X^2$ and $X^3$ are independently selected from aryl groups with an ortho substituted, substituted phenyl having a formula 2,6-$R^{16}R^{17}$-phenyl; where $R^{16}$ and $R^{17}$ are independently selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof. In some aspects of these embodiments, $X^2$ and $X^3$ are aryl groups with an ortho substituted 2,6-dimethoxy phenyl.

In some embodiments of the present invention, the at least one ligand having a structure according to Formula (II) is according to the Formula III:

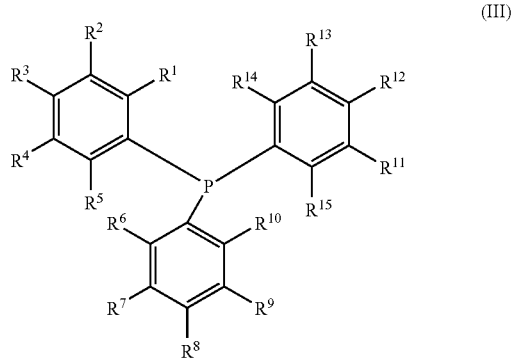

(III)

wherein $R^1$-$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof; wherein $R^{15}$ is selected from —$SO_3$, —$PO_3$, —$AsO_3$, and —$C(CF_3)_2O$; alternatively wherein $R^{15}$ is —$SO_3$.

In some embodiments of the present invention, none of $R^1$, $R^5$, $R^6$ and $R^{10}$ is selected from $CH_3$, $CF_3$, F, $SMe_2$, biphenyl and phenoxy.

In some embodiments of the present invention, two or more adjacent R groups selected from $R^1$-$R^5$ may be linked to form a substituted or unsubstituted, saturated or unsaturated ring structure.

In some embodiments of the present invention, two or more adjacent R groups selected from $R^6$-$R^{10}$ may be linked to form a substituted or unsubstituted, saturated or unsaturated ring structure.

In some embodiments of the present invention, two or more adjacent R groups selected from $R^{11}$-$R^{14}$ may be linked to form a substituted or unsubstituted, saturated or unsaturated ring structure.

In some embodiments of the present invention, at least one of $R^1$, $R^5$, $R^6$ and $R^{10}$ may be selected from a phenyl and a derivative thereof. In some aspects of these embodiments, at least one of $R^1$, $R^5$, $R^6$ and $R^{10}$ is an ortho substituted phenyl. In some aspects of these embodiments, the ortho substituted phenyl is 2,6-$R^{16}R^{17}$-phenyl, wherein $R^{16}$ and $R^{17}$ are independently selected from hydrogen, halogen, $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof. In some aspects of these embodiments, the derivatives of the foregoing groups may include such groups optionally substituted with hydrocarbyl and/or heteroatom substituents selected from linear or branched $C_1$-$C_5$ alkyl, linear or branched $C_1$-$C_5$ haloalkyl, linear or branched $C_2$-$C_5$ alkenyl and haloalkenyl, halogen, sulfur, oxygen, nitrogen, phosphorus and phenyl, optionally substituted with linear or branched $C_1$-$C_5$ alkyl, linear or branched $C_1$-$C_5$ haloalkyl and halogen. In some aspects of these embodiments, the cycloalkyl and cycloalkenyl groups may be monocyclic or multicyclic. In some aspects of these embodiments, the aryl groups may comprise a single ring (e.g., phenyl) or a fused ring system (e.g., naphthyl, anthracenyl). In some aspects of these embodiments, the cycloalkyl, cycloalkenyl and aryl groups may be taken together to form a fused ring system. In some aspects of these embodiments, each of the monocyclic and multicyclic ring systems may optionally be monosubstituted or multisubstituted with a substituent independently selected from hydrogen, linear and branched $C_1$-$C_5$ alkyl, linear and branched $C_1$-$C_5$ haloalkyl, linear and branched $C_1$-$C_5$ alkoxy, chlorine, fluorine, iodine, bromine, $C_5$-$C_{10}$ cycloalkyl, $C_6$-$C_{15}$ cycloalkenyl and $C_6$-$C_{30}$ aryl.

In some embodiments of the present invention, at least one of $R^1$, $R^5$, $R^6$ and $R^{10}$ is 2,6-dimethoxy phenyl. In some aspects of these embodiments, $R^{13}$ is a methyl, $R^1$ or $R^5$ is a 2,6-dimethoxy phenyl; and $R^6$ or $R^{10}$ is a 2,6-dimethoxy phenyl.

In some embodiments of the present invention, the catalyst composition is prepared as a discrete complex according to Formula IV

(IV)

wherein j=1 or 2; i=0 or 1; and j+i=2; wherein $R^{22}$ is selected from H and a hydrocarbyl radical; preferably $R^{22}$ is selected from H, a $C_{1-20}$ cyclic hydrocarbyl radical and a $C_{1-20}$ aliphatic hydrocarbyl radical; wherein L is a labile neutral electron donor ligand; and, wherein Q is selected from phosphorus and arsenic; wherein M is selected from Ni and Pd; wherein $R^{15}$ is selected from —$SO_3$, —$PO_3$, —$AsO_3$, and —$C(CF_3)_2O$; wherein $X^1$, $X^2$ and $X^3$ are as described supra; with the proviso that when j=2; i=0 and each $R^{15}$ is bound to both metal centers, M. In some aspects of these embodiments, L is selected from pyridine; substituted pyridines; nitrile (e.g., acetonitrile); substituted nitrile; ammonia; alkyl amines; substituted alkyl amines; aryl amines; substituted aryl amines; water; alkyl phosphines; substituted alkyl phosphines; aryl phosphines; substituted aryl phosphines; alkyl phosphites; substituted alkyl phosphites; aryl phosphites; substituted aryl phosphites; cyclic olefins (e.g., cyclooctadiene, cyclooctatetraene, norbornadiene and dicyclopentadiene); substituted cyclic olefins; aliphatic ethers; substituted aliphatic ethers; cyclic ethers; substituted cyclic ethers; acetates; substituted acetates; ketones and substituted ketones. In some aspects of these embodiments, L is selected from pyridine, substituted pyridines and ammonia. In some aspects of these embodiments, L is selected from pyridine and substituted pyridines.

In some embodiments of the present invention, the catalyst composition is prepared in situ by reacting a ligand having a structure according to Formula II with a palladium salt. In some aspects of these embodiments, the ligand having a structure according to Formula II is used in an acid or salt form, wherein $R^{15}$ further comprises a proton or a cation which reacts with the palladium salt to form the catalyst composition. In some aspects of these embodiments, $R^{15}$ is selected from $-SO_3E$, $-PO_3E$, $-AsO_3E$, and $-C(CF_3)_2OE$; wherein E is selected from H, Na, K, Ag and an ammonium.

In some embodiments of the present invention, the at least one acyclic aliphatic olefin monomer is a $C_2$-$C_{20}$ acyclic aliphatic olefin. In some aspects of these embodiments, the at least one acyclic aliphatic olefin monomer is ethylene.

In some embodiments of the present invention, the copolymer contains 1 to 99.9 mol % acyclic aliphatic olefin monomer derived units. In some aspects of these embodiments, the copolymer contains 5 to 99.5 mol % acyclic aliphatic olefin monomer derived units. In some aspects of these embodiments, the copolymer contains 10 to 99 mol % acyclic aliphatic olefin monomer derived units. In some aspects of these embodiments, the copolymer contains 1 to 95 mol % acyclic aliphatic olefin monomer derived units. In some aspects of these embodiments, the copolymer contains 2 to 85 mol % acyclic aliphatic olefin monomer derived units. In some aspects of these embodiments, the copolymer contains 20 to 85 mol % acyclic aliphatic olefin monomer derived units. In some aspects of these embodiments, the copolymer contains 50 to 99 mol % acyclic aliphatic olefin monomer derived units. In some aspects of these embodiments, the copolymer contains 75 to 99 mol % acyclic aliphatic olefin monomer derived units. In some aspects of these embodiments, the copolymer contains 80 to 99 mol % acyclic aliphatic olefin monomer derived units. In some aspects of these embodiments, the copolymer contains 85 to 99 mol % acyclic aliphatic olefin monomer derived units. In some aspects of these embodiments, the copolymer contains 90 to 99 mol % acyclic aliphatic olefin monomer derived units.

In some embodiments of the present invention, the copolymer is a random copolymer.

In some embodiments of the present invention, the copolymer is substantially linear. That is, in some embodiments of the present invention, those portions of the copolymer derived from acyclic aliphatic olefin monomer units have a branch content of $\leq 15$ branches/1,000 carbon atoms; alternatively between 0.5 and 15 branches/1,000 carbon atoms; alternatively $\leq 10$ branches/1,000 carbon atoms; alternatively $\leq 5$ branches/1,000 carbon atoms. In some aspects of these embodiments, the branches contain at least two carbon atoms. The branching content of the copolymer is determined by Carbon 13 NMR and the melting point temperature of the copolymer.

In some embodiments of the present invention, the polymerization temperature is 0 to 200° C. In some aspects of these embodiments, the polymerization temperature is 10 to 180° C. In some aspects of these embodiments, the polymerization temperature is 30 to 150° C. In some aspects of these embodiments, the polymerization temperature is 60 to 120° C.

The copolymers of the present invention can be used in a variety of applications, including, for example, packaging, trash bags, shower curtains, decking, fencing and flooring; which materials may exhibit inherent biocidal activity or enhanced biodegradability due to their nitrogen containing vinyl monomer content.

Some embodiments of the present invention will now be described in detail in the following Examples. All fractions and percentages set forth below in the Examples are by weight unless otherwise specified. The chemical structures presented in Table 1 have been drawn according to the general rules for drawing Lewis structures of molecules as described in, for example, Brown, et al., *Organic Chemistry,* Brooks-Cole, 4th ed 2004.

EXAMPLE 1-16

Ligand Synthesis

Following the general procedure presented below using Component A and Component B identified in Table 1 in the amounts listed in Table 1, the Product Solids listed in Table 1 were prepared with the reported yield for examples 1-15, respectively.

Component A was added to a 100 mL flask ("Flask A") then placed under vacuum and refilled with nitrogen and charged with 60 mL of tetrahydrofuran (THF). Flask A was then placed in an ice bath and allowed to cool to 0° C. 10.1 mL of 2.5 molar n-BuLi was then injected. Flask A was then placed in a dry ice/acetone bath and allowed to cool to about −78° C.

A separate 500 mL Schlenk flask ("Flask B") was placed under vacuum. Flask B was purged with nitrogen and charged with ~50 mL of THF. Flask B was then placed in a dry ice/acetone bath and allowed to cool to about −78° C. 1.10 mL of $PCl_3$ was then added to Flask B with agitation. The contents of Flask A were then slowly transferred to Flask B using a cannula with vigorous agitation.

A separate 100 mL flask ("Flask C") was purged and filled with nitrogen. Flask C was then charged with ~60 mL of THF and Component B. Flask C was then placed in a dry ice/acetone bath and allowed to cool with agitation to about −78° C. 10.1 mL of 2.5 molar n-BuLi was added to Flask C and allowed to react for about 15 minutes. The contents of Flask C were then transferred to Flask B, maintained at −78° C., using a cannula with continued vigorous agitation. Following the complete addition of the contents of Flask C into Flask B, Flask B was allowed to warm to room temperature for about 30 minutes. The contents of Flask B were then poured into a 500 mL recovery flask (Flask D) and the THF was removed, leaving a solid. The solid in Flask D was then mixed with distilled water and then transferred to a separation flask (Flask E). 100 mL of $CH_2Cl_2$ was added to the contents of Flask E. Flask E was shaken to mix the two layers. About 5 mL of concentrated HCl was then added to Flask E. Flask E was shaken again. The mixture in Flask E was then allowed to settle, forming two layers—an organic phase on the bottom and a aqueous phase on the top. The organic layer was collected. The aqueous phase was washed with 50 mL of $CH_2Cl_2$. The organic wash material was collected and added to the previously collected organic layer material. The combined organic material was then contacted with MgSO$_4$ and rotovaped to dryness, leaving a solid. The solid was then washed first with diethyl ether and then with THF to remove impurities. The washed Product Solid was collected by filtration with the yield reported in Table 1.

TABLE 1

| Ex # | Component A | Component B | Product Solid/Yield | |
|---|---|---|---|---|
| | | | Chemical Name | Structure |
| 1 | benzene sulfonic acid (2.10 g) | 2',6'dimethoxy-2-biphenylbromide (7.45 g) | 2-(bis-2',6'dimethoxy-2-biphenyl)phosphino)benzene sulfonic acid (~5 g) | Structure I |
| 2 | benzene sulfonic acid (2.10 g) | 2-bromoethylbenzene (4.7 g) | 2-(bis-(2-ethylphenyl)phosphino)benzene sulfonic acid (~2 g) | Structure 2 |
| 3 | benzene sulfonic acid (2.10 g) | 4-bromo-N,N-dimethylaniline (5.1 g) | 2-(bis-(4-dimethylaminophenyl)phosphino benzene sulfonic acid (~2 g) | Structure III |
| 4 | napthalenesulfonic acid (2.63 g) | 2-bromoanisole (4.75 g) | 2-(bis (2-methoxyphenyl)phosphino)napthalene sulfonic acid (~1.5 g) | Structure IV |

TABLE 1-continued

| | | | Product Solid/Yield | |
|---|---|---|---|---|
| Ex # | Component A | Component B | Chemical Name | Structure |
| 5 | benzene sulfonic acid (2.10 g) | 2-bromo-naphthalene (5.25 g) | 2-(bis-(2-naphthalenyl)phosphino)benzene sulfonic acid (~2 g) | 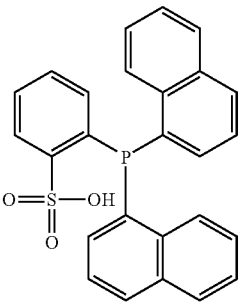<br>Structure V |
| 6 | benzene sulfonic acid (2.10 g) | Ferrocene (4.7 g) | 2-(bis(ferrocenyl)phosphino)benzene sulfonic acid (~2 g) | 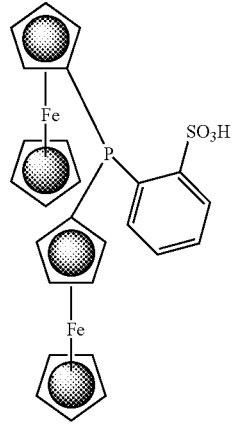<br>Structure VI |
| 7 | benzene sulfonic acid (2.10 g) | Bromo-2,4,6-trimethoxybenzene (6.25 g) | 2-(bis-(2,4,6-trimethoxyphenyl)phosphino)benzene sulfonic acid (~2 g) | 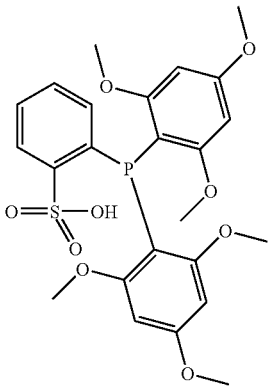<br>Structure VII |

TABLE 1-continued

| Ex # | Component A | Component B | Product Solid/Yield | |
|---|---|---|---|---|
| | | | Chemical Name | Structure |
| 8 | benzene sulfonic acid (2.10 g) | Bromo-2,4,-dimethoxybenzene (5.5 g) | 2-(bis-(2,4,-dimethoxyphenyl)phosphino)benzene sulfonic acid (~2 g) | 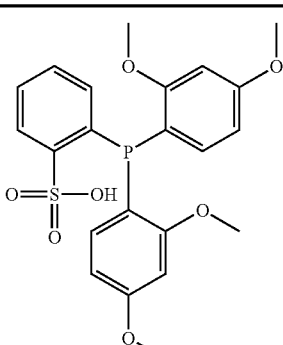<br>Structure VIII |
| 9 | benzene sulfonic acid (2.10 g) | Mesitylbromide (5.04 g) | 2-(bis(mesityl)phosphino)benzene sulfonic acid (~2 g) | 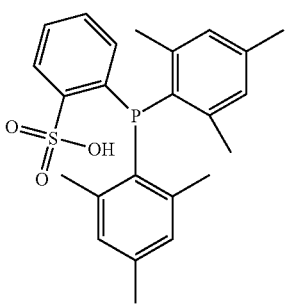<br>Structure IX |
| 10 | napthalenesulfonic acid (2.63 g) | Mesitylbromide (5.04 g) | 2-(bis(mesityl)phosphino) napthalene sulfonic acid (~2.5 g) | 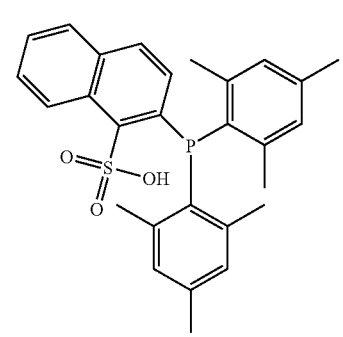<br>Structure X |
| 11 | benzene sulfonic acid (2.10 g) | 2-bromobiphenyl (5.9 g) | 2-(bis (2-biphenyl)phosphino)benzene sulfonic acid (~2 g) | 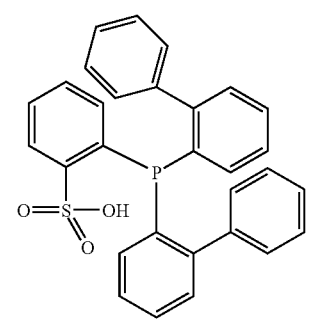<br>Structure XI |

TABLE 1-continued

| Ex # | Component A | Component B | Product Solid/Yield | |
|---|---|---|---|---|
| | | | Chemical Name | Structure |
| 12 | benzene sulfonic acid (2.10 g) | 3,5-di-t-butyl-bromobenzene (6.81 g) | 2-(bis (3,4-di-t-butyl-phenyl)phosphino) benzene sulfonic acid (~2 g) | 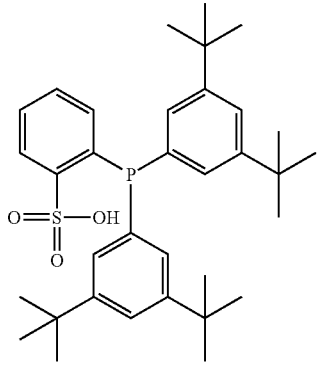<br>Structure XII |
| 13 | benzoic acid (2.10 g) | 2',6'dimethoxy-2-biphenylbromide (7.45 g) | 2-(bis-2',6'dimethoxy-2-biphenyl) phosphino) benzoic acid (~5 g) | 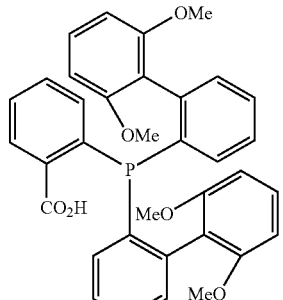<br>Structure XIII |
| 14 | 4-nitrobenzene sulfonic acid (2.10 g) | 2-bromoanisole (4.75 g) | 2-(Bis(2-methoxy-phenyl)-phosphanyl)-4-nitro-benzenesulfonic acid (~2 g) | 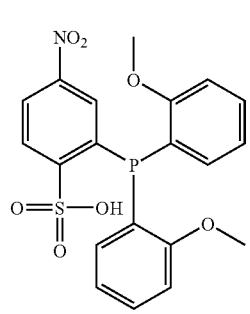<br>Structure XIV |
| 15 | benzene sulfonic acid (2.10 g) | Bromocylcohexane (4.13 g) | 2-Dicylohexyl phospanyl-benzenesulfonic acid (~2 g) | 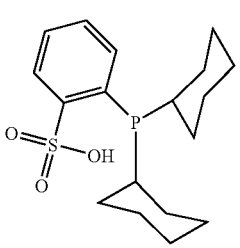<br>Structure XV |

EXAMPLE 16

Synthesis of a Potassium Salt of the Ligand of Structure VI

A 0.45 g (0.81 mmol) sample of Product Solid (i.e., ligand Structure VI) prepared according to Example 6 was added to 50 mL of THF in a reaction flask with vigorous agitation to form a ligand solution. In a separate container, 0.10 g (0.88 mmol) of potassium tert-butoxide was dissolved in 20 mL of THF. The resulting potassium tert-butoxide solution was then added dropwise to the contents of the reaction flask with agitation. Following the addition of the potassium tert-butoxide solution, the contents of the reaction flask were reduced by vacuum extraction of some of the THF solvent leaving approximately 25 mL of product solution in the reaction flask. A potassium salt of the ligand was then precipitated from the remaining product solution through the addition of 20 mL of pentane. The precipitated potassium salt of the ligand was recovered by filtration through a fine porosity frit and washed with pentane 3×20 mL. The potassium salt of the ligand was then subjected to vacuum to remove the remaining volatiles, leaving a dark orange Product Powder 0.40 g (0.67 mmol, 83%).

EXAMPLE 17

Synthesis of a Silver Salt of the Ligand of Structure VII

A 0.75 g (1.43 mmol) sample of the Product Solid (i.e., ligand Structure VII) prepared according to Example 7 was added to 50 mL of methanol in a reaction flask with vigorous agitation. In a separate container, 0.23 g (1.36 mmol) of silver nitrate was dissolved in 50 mL of deionized water. The resulting silver nitrate solution was then added dropwise to the contents of the reaction flask with vigorous agitation. Agitation of the contents of the reaction flask was continued for 20 minutes following addition of the silver nitrate solution. The contents of the reaction flask were then reduced by vacuum extraction of some of the solvent leaving approximately 50 mL and resulting in the formation of a gray precipitate. The precipitate was recovered by filtration through a fine porosity frit and washed with water 2×20 mL. The silver salt of the ligand was then dried under reduced pressure, leaving a dark gray Product Powder (0.35 g, 0.62 mmol, 44%).

EXAMPLES 18-31

Preparation Transition Metal Catalyst Complexes

A sample of Component A identified in Table 2 was added to 30 mL of tetrahydrofuran in a reaction flask with agitation. To the contents of the reaction flask was then added Component B identified in Table 2, with continued agitation. The contents of the reaction flask were then agitated for 30 minutes before adding Component C identified in Table 2. The contents of the reaction flask were then reduced under vacuum and pentane was added to precipitate the product catalyst complex. The product catalyst complex was collected by filtration through a fine porosity frit and washed with pentane 2×20 mL. The product catalyst complex was then subjected to vacuum to remove the remaining volatiles, leaving the Product Yield reported in Table 2.

TABLE 2

| Ex.# | Component A | Component B | Component C | Product Yield |
|---|---|---|---|---|
| 18 | Product Solid prepared according to Example 1 (0.943 g) | dimethyl tetramethylethylene diamine palladium (II) (0.388 g) | Pyridine (~0.2 ml) | 940 mg |
| 19 | Product Solid prepared according to Example 2 (340 mg) | dimethyl tetramethylethylene diamine palladium (II) (200 mg) | Pyridine (~0.2 ml) | 440 mg |
| 20 | Product Solid prepared according to Example 3 (79 mg) | dimethyl tetramethylethylene diamine palladium (II) (50 mg) | Pyridine (~0.2 ml) | 87 mg |
| 21 | Product Solid prepared according to Example 4 (45 mg) | dimethyl tetramethylethylene diamine palladium (II) (25 mg) | Pyridine (~0.2 ml) | 33 mg |
| 22 | Product Solid prepared according to Example 5 (44 mg) | dimethyl tetramethylethylene diamine palladium (II) (25 mg) | Pyridine (~0.2 ml) | 41 mg |
| 23 | Product Solid prepared according to Example 8 (0.370 g) | dimethyl tetramethylethylene diamine palladium (II) (0.200 g) | Pyridine (~0.2 ml) | 440 mg |
| 24 | Product Solid prepared according to Example 9 (0.640 g) | dimethyl tetramethylethylene diamine palladium (II) (0.350 g) | Pyridine (~0.2 ml) | 700 mg |
| 25 | Product Solid prepared according to Example 11 (0.396 g) | dimethyl tetramethylethylene diamine palladium (II) (0.200 g) | Pyridine (~0.2 ml) | 540 mg |
| 26 | Product Solid prepared according to Example 12 (0.2272 g) | dimethyl tetramethylethylene diamine palladium (II) (0.100 g) | Pyridine (~0.2 ml) | 320 mg |

TABLE 2-continued

| Ex.# | Component A | Component B | Component C | Product Yield |
|------|-------------|-------------|-------------|---------------|
| 27 | Product Solid prepared according to Example 13 (210 mg) | dimethyl tetramethylethylene diamine palladium (II) (150 mg) | Pyridine (~0.2 ml) | 200 mg |
| 28 | Product Solid prepared according to Example 14 (115 mg) | dimethyl tetramethylethylene diamine palladium (II) (50 mg) | Pyridine (~0.2 ml) | 78 mg |
| 29 | Product Solid prepared according to Example 15 (83 mg) | dimethyl tetramethylethylene diamine palladium (II) (50 mg) | Pyridine (~0.2 ml) | 5 mg |
| 30 | Product Powder prepared according to Example 16 (0.135 g) | (1,5 cyclooctadiene) methyl palladium (II) triflate (0.086 g) | none | 148 mg |
| 31 | Product Powder prepared according to Example 17 (0.098 g) | chloro(1,5 cyclooctadiene) methyl palladium (II) (0.046 g) | none | 780 mg |

EXAMPLE 32

Ligand Synthesis

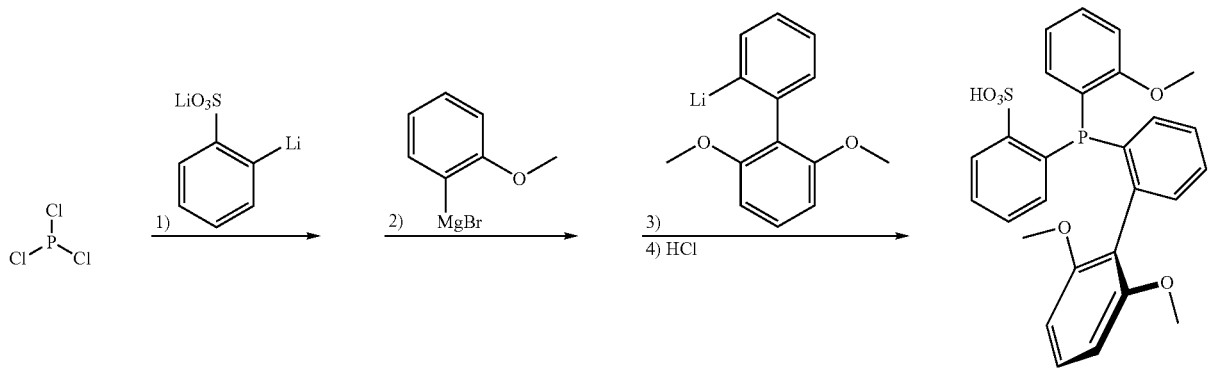

A first 100 mL Schlenk flask was charged with benzenesulfonic acid hydrate (1.7 g, 10.7 mmol, $C_6H_6O_3S \cdot H_2O$, 158.71 g/mol, MP Bio Medicals 98-11-3). The flask was evacuated under vacuum. The bottom of the flask was then heated using a heat gun. The flask contents melted to form a brown liquid, which started bubbling. The heating was continued until the liquid started to reflux and the pressure dropped to approximately 10 mTorr. The flask was filled with nitrogen, cooled and THF (anhydrous, Acros, ~50 mL) was added to the flask forming a clear colorless solution. At 0° C., n-BuLi (2.5 M hexane solution, 11.4 mmol, 8.6 mL, Aldrich) was added to yield a beige suspension, which was stirred for 0.5 hr before being cooled at −78° C.

A second 100 mL Schlenk flask was charged with Mg (0.30 g, 0.0125 mmol, powder, Aldrich). THF (50 mL, anhydrous, Acros) and 2-bromoanisole (2.10 g, 0.0112 mmol, $C_7H_7BrO$, 187.04 g/mol, Acros) were added to the second Schlenk flask. The contents of the second Schlenk flask were sonicated (~30 sec.) and the contents were observed to exhibit a temperature rise. The mixture was stirred until it cooled back down to room temperature.

A 200 mL Schlenk flask was charged with THF (~50 mL). At −78° C., $PCl_3$ (0.93 mL, 1.47 g, 0.0107 mol, 1.574 g/mL, 137.33 g/mol, Aldrich) was added to the 200 mL Schlenk flask via syringe. The beige suspension in the first 100 mL Schlenk flask was transferred to the 200 mL Schlenk flask at −78° C. via cannula. The contents of the 200 mL Schlenk flask were then stirred for 0.5 hours while maintaining the temperature at −78° C. The contents of the second 100 mL Schlenk flask was cooled to −78° C.—and transferred to the 200 mL Schlenk flask via cannula. The contents of the 200 mL Schlenk flask were then warmed to ambient temperature and stirred for about an hour to yield a yellow solution.

A 500 mL Schlenk flask was charged with 2'-Br-2,6-(Me)$_2$ biphenyl (3.14 g, 10.7 mmol, $C_{14}H_{13}BrO_2$, 293.16 g/mol, Aldrich) ant THF (150 mL). The contents of the 500 mL Schlenk flask were cooled to −78° C. n-BuLi (4.3 mL, 2.5 M hexane solution, 10.7 mmol, Aldrich) at −78° C. was added to the 500 mL Schlenk flask, yielding a thick, white slurry. The 500 mL Schlenk flask was shaken by hand to ensure mixing. A 0.5 hour after the addition of the n-BuLi, the contents of the 200 mL Schlenk flask were added to the 500 mL Schlenk flask via cannula. The contents of the 500 mL Schlenk flask were then allowed to gradually warm to ambient temperature. The contents of the 500 mL Schlenk flask were stirred overnight to yield a clear yellow solution. The volatiles were removed from the 500 mL Schlenk flask under vacuum. The resulting solid was extracted using $CH_2Cl_2$ (200 mL), $H_2O$ (200 mL), HCl (concentrated, 20 mL). The organic layer from the extract was dried with $MgSO_4$ and the volatile portion of the extract was removed under vacuum to leave a pale yellow solid. The pale yellow solid was collected and washed with THF (3×15 mL) and $Et_2O$ (3×15 mL) to yield a white powder product ligand (2.3 g, 44% yield). $^1H$ NMR ($CDCl_3$, ° C.): δ8.32 (m, 1H), 7.71 (q, J=8.5, 2H), 7.56 (m, 1H), 7.47-7.40 (m, 4H), 7.33-7.27 (m, 2H), 6.99 (m, 2H), 6.91 (m, 1H), 6.57 (d, J=8.5, 1H), 6.44 (d, J=8.5, 1H), 3.73 (s, 3H), 3.64 (s, 3H), 3.19 (s, 3H). $^{31}P$ NMR ($CDCl_3$, ° C.): δ-7.1 (s). LC-MS: m/z=509.2.

EXAMPLE 33

Ligand Synthesis

Toluene sulfonic acid (2.10 g., 11.0 mmol) was added to a 100 mL flask ("Flask A"). Flask A was then placed under vacuum and refilled with nitrogen. Tetrahydrofuran (THF) (60 mL) was then charged to Flask A. Flask A was then placed in an ambient temperature water bath and n-Butyl Lithium (n-BuLi) (8.4 mL of 2.5 molar) was then injected into Flask A. Flask A was then placed in a dry ice/acetone bath and allowed to cool to about −78° C.

A separate 500 mL Schlenk flask ("Flask B") was placed under vacuum. Flask B was then purged with nitrogen and charged with ~50 mL of THF. Flask B was then placed in a dry ice/acetone bath and allowed to cool to about −78° C. Phosphorus trichloride ($PCl_3$) (1.06 mL, 12.1 mmol) was then added to Flask B with agitation. The contents of Flask A were then slowly transferred to Flask B using a cannula with vigorous agitation.

A separate 100 mL flask ("Flask C") was purged and filled with nitrogen. Flask C was then charged with ~60 mL of THF and 2-Bromoanisole (4.24 g., 22.6 mmol). Flask C was then placed in a dry ice/acetone bath and allowed to cool with agitation to about −78° C. 9.06 mL of 2.5 molar n-BuLi was added to Flask C and allowed to react for about 15 minutes. The contents of Flask C were then transferred to Flask B, maintained at −78° C., using a cannula with continued vigorous agitation. Following the complete addition of the contents of Flask C into Flask B, Flask B was allowed to warm to room temperature for one hour. The contents of Flask B were then poured into a 500 mL recovery flask (Flask D) and the THF was removed, leaving a solid. The solid in Flask D was then mixed with ~150 mL of distilled water and then transferred to a separation flask (Flask E). 100 mL of Methylene Chloride ($CH_2Cl_2$) was added to the contents of Flask E. Flask E was shaken to mix the two layers. About 10 mL of concentrated HCl was then added to Flask E. Flask E was shaken again. The mixture in Flask E was then allowed to settle, forming two layers—an organic phase on the bottom and an aqueous phase on the top. The organic layer was collected. The aqueous phase was washed with 50 mL of $CH_2Cl_2$. The organic wash material was collected and added to the previously collected organic layer material. The combined organic material was then contacted with Magnesium Sulfate and rotovaped to dryness, leaving a solid. The solid was then washed with THF to remove impurities. Approximately 1 g of the washed product solid 2-[Bis-2-methoxyphenyl)-phosphanyl]toluene sulfonic acid was collected by filtration.

EXAMPLE 34

Ligand Synthesis

Toluene sulfonic acid (2.05 g., 10.8 mmol) was added to a 100 mL flask ("Flask A") then placed under vacuum and refilled with nitrogen and charged with 50 mL of tetrahydrofuran (THF). Flask A was then placed in an ice bath and allowed to cool to 0° C. n-Butyl Lithium (n-BuLi) (8.8 mL of 2.5 molar) was then injected into Flask A. Flask A was then placed in a dry ice/acetone bath and allowed to cool to about −78° C.

A separate 200 mL Schlenk flask ("Flask B") was placed under vacuum. Flask B was purged with nitrogen and charged with ~50 mL of THF. Phosphorus trichloride ($PCl_3$) (1.0 mL, 11.5 mmol) was then added to Flask B with agitation. Flask B was then placed in a dry ice/acetone bath and allowed to cool to about −78° C. The contents of Flask A were then slowly transferred to Flask B using a cannula with vigorous agitation.

A separate 500 mL flask ("Flask C") was purged and filled with nitrogen. Flask C was then charged with ~200 mL of THF and 2'-Bromo-2,6-dimethoxybiphenyl (7.26 g., 24.8 mmol). Flask C was then placed in a dry ice/acetone bath and allowed to cool with agitation to about −78° C. n-BuLi (10.03 mL of 2.5 molar) was added to Flask C and allowed to react for about 10 minutes. The contents of Flask B were then transferred to Flask C, maintained at −78° C., using a cannula with continued vigorous agitation. Following the complete addition of the contents of Flask B into Flask C, Flask C was allowed to warm to room temperature for 45 min. The contents of Flask C were then poured into a 1000 mL recovery flask (Flask D) and the THF was removed, leaving a solid. The solid in Flask D was then mixed with ~150 mL of distilled water and then transferred to a separation flask (Flask E). 100 mL of Methylene Chloride ($CH_2Cl_2$) was added to the contents of Flask E. Flask E was shaken to mix the two layers. About 20 mL of concentrated HCl was then added to Flask E and was shaken again. ~20 mL of 3A alcohol was added to Flask E and was shaken again. The mixture in Flask E was then allowed to settle, forming two layers—an organic phase on the bottom and an aqueous phase on the top. The organic layer was collected. The aqueous phase was washed with 50 mL of $CH_2Cl_2$. The organic wash material was collected and added to the previously collected organic layer material. The combined organic material was then contacted with Magnesium Sulfate and rotovaped to dryness, leaving a solid. The solid was then washed with THF and diethyl ether to remove impurities. Approximately 2 g of the washed product solid 2-Bis(2',6'-dimethoxy-2-biphenyl-2yl)-phosphanyl]-toluene sulfonic acid was collected by filtration.

EXAMPLES 35

Ligand Synthesis

Magnesium Reagent Plus ≧99% powder, 50 mesh (0.3 g., 12.3 mmol) was added to a 100 mL flask ("Flask A") then placed under vacuum and refilled with nitrogen and charged with 60 mL of tetrahydrofuran (THF). 2-Bromoanisole (2.18 g., 11.7 mmol) was added to Flask A. The contents in Flask A were allowed to react for 2 hours. Flask A was then placed in a dry ice/acetone bath and allowed to cool to about −78° C.

Toluene Sulfonic Acid (2.22 g., 11.7 mmol) was placed into a separate 100 mL Schlenk flask ("Flask B") and was placed under vacuum. Flask B was purged with nitrogen and charged with ~60 mL of THF. Flask B was then placed in an ice bath and allowed to cool to 0° C. n-Butyl Lithium (n-BuLi) (9.3 mL of 2.5 molar) was then injected. Flask B was then placed in a dry ice/acetone bath and allowed to cool to about −78° C. A separate 200 mL Schlenk flask ("Flask C") was placed under vacuum. Flask C was purged with nitrogen and charged with ~50 mL of THF. Phosphorus trichloride ($PCl_3$) (1.02 mL, 11.7 mmol) was then added to Flask C with agitation. Flask C was then placed in a dry ice/acetone bath and allowed to cool to about −78° C. The contents of Flask B were then slowly transferred to Flask C using a cannula with vigorous agitation. The contents in Flask C were allowed to react for 45 min. The contents of Flask A were then slowly transferred to Flask C and the contents of Flask C were slowly warmed up to room temperature. Flask C was then placed in a dry ice/acetone bath and allowed to cool to about −78° C.

A separate 500 mL flask ("Flask D") was purged and filled with nitrogen. Flask D was then charged with ~150 mL of THF and 2'-Bromo-2,6-dimethoxybiphenyl (3.42 g., 11.7 mmol). Flask D was then placed in a dry ice/acetone bath and allowed to cool with agitation to about −78° C. n-BuLi (4.7 mL of 2.5 molar) was added to Flask D and allowed to react for about 15 minutes. The contents of Flask C were then transferred to Flask D, maintained at −78° C., using a cannula with continued vigorous agitation. Following the complete addition of the contents of Flask C into Flask D, Flask D was allowed to warm to room temperature overnight. The contents of Flask D were then poured into a 1000 mL recovery flask (Flask E) and the THF was removed, leaving a solid. The solid in Flask E was then mixed with ~100 mL of distilled water and then transferred to a separation flask (Flask F). 100 mL of Methylene Chloride ($CH_2Cl_2$) was added to the contents of Flask F. Flask F was shaken to mix the two layers. About 20 mL of concentrated HCl was then added to Flask F. Flask F was shaken again. The mixture in Flask F was then allowed to settle, forming two layers—an organic phase on the bottom and an aqueous phase on the top. The organic layer was collected. The aqueous phase was washed with 50 mL of $CH_2Cl_2$. The organic wash material was collected and added to the previously collected organic layer material. The combined organic material was then contacted with Magnesium Sulfate and rotovaped to dryness, leaving a solid. The solid was then washed with THF and diethyl ether to remove impurities. Approximately 1.65 g. of the washed product solid 2-[(2',6'-Dimethoxy-biphenyl-2yl)-(2-methoxy-phenyl)-phosphanyl]-toluene sulfonic acid was collected by filtration.

EXAMPLES 36-38

Preparation Transition Metal Catalyst Complexes

A sample of Component A identified in Table 1 was added to ~20 mL of tetrahydrofuran (THF) in a reaction flask with agitation. To the contents of the reaction flask was then added Component B identified in Table 1, with continued agitation. The contents of the reaction flask were then agitated for approximately 1 hour. The product catalyst complex was collected by filtration through a fine porosity frit and washed with THF. The product catalyst complex was then subjected to vacuum to remove the remaining volatiles, leaving the Product Yield reported in Table 1.

TABLE 1

| Ex.# | Component A | Component B | Product Yield |
|---|---|---|---|
| 36 | Product Solid prepared according to Example 33 (5.0 g) | dimethyl tetramethylethylene diamine palladium (II) (3.09 g) | 6.98 g |
| 37 | Product Solid prepared according to Example 34 (1.364 g) | dimethyl tetramethylethylene diamine palladium (II) (0.554 g) | 1.154 g |
| 38 | Product Solid prepared according to Example 35 (0.932 g) | dimethyl tetramethylethylene diamine palladium (II) (0.482 g) | 0.874 g |

EXAMPLES 39-40

Preparation Transition Metal Catalyst Complexes

A sample of Component A identified in Table 2 was added to ~30 mL of methylene chloride ($CH_2Cl_2$) in a reaction flask with agitation. To the contents of the reaction flask was then added Component B identified in Table 2, with continued agitation. The contents of the reaction flask were then agitated for approximately 1 hour. The contents of the reaction flask were then reduced under vacuum and ether was added to precipitate the product catalyst complex. The product catalyst complex was collected by filtration through a fine porosity frit and washed with ether. The product catalyst complex was then subjected to vacuum to remove the remaining volatiles, leaving the Product Yield reported in Table 2.

TABLE 2

| Ex.# | Component A | Component B | Product Yield |
|---|---|---|---|
| 39 | Product Solid prepared according to Example 36 (6.98 g) | Pyridine (1.5 ml) | 4.4 g |
| 40 | Product Solid prepared according to Example 38 (0.229 g) | Pyridine (~1 mL) | 0.211 g |

EXAMPLE 41

Polymerization

In a nitrogen filled glovebox, a 13 mL reactor cell of an Argonaut Technologies Endeavor™ was charged with 9-Vinylcarbazole (1.07 g, 5.5 mmol) that was purified by vacuum transfer. Toluene (4.0 mL) was charged in the reactor cell, and the contents of the reactor cell were then heated to 80° C. and pressurized with ethylene gas to 50 psig. After equilibration, a sample of a catalyst complex prepared according to Example 39 (3.48 mg, 5.6 mmol) in 0.5 mL toluene and was injected into the reactor cell. The injection was followed by a 0.5 mL injection of toluene. After 60 minutes, the reactor cell was vented and allowed to cool. The contents of the reactor cell were then removed from the glovebox and were added to rapidly stirred methanol. After 18 hours, the resulting mixture was isolated using centrifugation. The mixture was dried overnight at 60° C. and under reduced pressure. The subject reaction yielded 0.0731 g of a random copolymer of ethylene and 9-Vinylcarbazole with a 9-Vinylcarbazole incorporation of 2.3 mol %; a weight average molecular weight, $M_w$, of 17,000 and a number average molecular weight, $M_n$, of 7,000.

EXAMPLE 42

Polymerization

In a nitrogen filled glovebox, a 13 mL reactor cell of an Argonaut Technologies Endeavor™ was charged with 9-Vinylcarbazole (1.07 g, 5.5 mmol) that was purified by vacuum transfer. Toluene (4.0 mL) was charged in the reactor cell, and the contents of the reactor cell were then heated to 80° C. and pressurized with ethylene gas to 400 psig. After equilibration, a sample of a catalyst complex prepared according to Example 40 (4.08 mg, 5.6 μmol) in 0.5 mL toluene and was injected into the reactor cell. The injection was followed by a 0.5 mL injection of toluene. After 60 minutes, the reactor cell was vented and allowed to cool. The contents of the reactor cell were then removed from the glovebox and were added to rapidly stirred methanol. After 18 hours, the resulting mixture was isolated using centrifugation. The mixture was dried overnight at 60° C. and under reduced pressure. The subject reaction yielded 1.1769 g of a random copolymer of ethylene and 9-Vinylcarbazole with a 9-Vinylcarbazole incorporation of 1.3 mol %; a weight average molecular weight, $M_w$, of 52,500 and a number average molecular weight, $M_n$, of 12,000.

EXAMPLE 43

Polymerization

In a nitrogen filled glovebox, a 13 mL reactor cell of an Argonaut Technologies Endeavor™ was charged with 1-Vinyl-2-Pyrrolidone (0.5 mL, 4.68 mmol) that was purified by vacuum transfer. Toluene (4.5 mL) was charged in the reactor cell, and the contents of the reactor cell were then heated to 100° C. and pressurized with ethylene gas to 400 psig. After equilibration, a sample of a catalyst complex prepared according to Example 36 (2.1 mg, 4 μmol per Pd) in 0.5 mL toluene and was injected into the reactor cell. The injection was followed by a 0.5 mL injection of toluene. After 60 minutes, the reactor cell was vented and allowed to cool. The contents of the reactor cell were then removed from the glovebox and were added to rapidly stirred methanol. After 18 hours, the resulting mixture was isolated using centrifugation. The mixture was dried overnight at 60° C. and under reduced pressure. The subject reaction yielded 0.170 g of a random copolymer of ethylene and 1-Vinyl-2-Pyrrolidone with a 1-Vinyl-2-Pyrrolidone incorporation of 0.5 mol %; a weight average molecular weight, $M_w$, of 39,000 and a number average molecular weight, $M_n$, of 19,000.

EXAMPLE 44

Polymerization

In a nitrogen filled glovebox, a 13 mL reactor cell of an Argonaut Technologies Endeavor™ was charged with 1-Vinyl-2-Pyrrolidone (0.5 mL, 4.68 mmol) that was purified by vacuum transfer. Toluene (4.5 mL) was charged in the reactor cell, and the contents of the reactor cell were then heated to 60° C. and pressurized with ethylene gas to 400 psig. After equilibration, a sample of a catalyst complex prepared according to Example 37 (3.6 mg, 5.6 μmol per Pd) in 0.5 mL toluene and was injected into the reactor cell. The injection was followed by a 0.5 mL injection of toluene. After 60 minutes, the reactor cell was vented and allowed to cool. The contents of the reactor cell were then removed from the glovebox and were added to rapidly stirred methanol. After 18 hours, the resulting mixture was isolated using centrifugation. The mixture was dried overnight at 60° C. and under reduced pressure. The subject reaction yielded 0.14 g of a random copolymer of ethylene and 1-Vinyl-2-Pyrrolidone with a 1-Vinyl-2-Pyrrolidone incorporation of 0.2 mol %; a weight average molecular weight, $M_w$, of 206,000 and a number average molecular weight, $M_n$, of 112,500.

EXAMPLE 45

Polymerization

In a nitrogen filled glovebox, a 13 mL reactor cell of an Argonaut Technologies Endeavor™ was charged with N,N-Dimethylacrylamide (1.0 mL, 9.70 mmol) that was purified by vacuum transfer. Toluene (4.0 mL) was charged in the reactor cell, and the contents of the reactor cell were then heated to 80° C. and pressurized with ethylene gas to 400 psig. After equilibration, a sample of a catalyst complex prepared according to Example 37 (1.5 mg, 2.0 μmol per Pd) in 0.5 mL toluene and was injected into the reactor cell. The injection was followed by a 0.5 mL injection of toluene. After 60 minutes, the reactor cell was vented and allowed to cool. The contents of the reactor cell were then removed from the glovebox and were added to rapidly stirred methanol.

EXAMPLE 46

Polymerization

In a nitrogen filled glovebox, a 13 mL reactor cell of an Argonaut Technologies Endeavor™ was charged with N-Vinylphthalimide (2.0 mL of 1.44M solution in toluene, 2.88 mmol). Toluene (3.0 mL) was charged in the reactor cell, and the contents of the reactor cell were then heated to 80° C. and pressurized with ethylene gas to 100 psig. After equilibration, a sample of a catalyst complex prepared according to Example 36 (1.5 mg, 2.0 μmol per Pd) in 0.5 mL toluene and was injected into the reactor cell. The injection was followed by a 0.5 mL injection of toluene. After 60 minutes, the reactor cell was vented and allowed to cool. The contents of the reactor cell were then removed from the glovebox and were added to rapidly stirred methanol. After 18 hours, the resulting mixture was isolated using centrifugation. The mixture was dried overnight at 60° C. and under reduced pressure. The subject reaction yielded 0.18 g of a random copolymer of ethylene and N-Vinylphthalimide with a N-Vinylphthalimide incorporation of 0.5 mol %, a weight average molecular weight, $M_w$, of 37,000 and a number average molecular weight, $M_n$, of 21,000.

EXAMPLE 47

Polymerization

In a nitrogen filled glovebox, a 13 mL reactor cell of an Argonaut Technologies Endeavor™ was charged with N-Vinylphthalimide (2.0 mL of 1.44M solution in toluene, 2.88 mmol). Toluene (3.0 mL) was charged in the reactor cell, and the contents of the reactor cell were then heated to 80° C. and pressurized with ethylene gas to 100 psig. After equilibration, a sample of a catalyst complex prepared according to Example 36 (1.07 mg, 2.0 μmol per Pd) in 0.5 mL toluene and was injected into the reactor cell. The injection was followed by a 0.5 mL injection of toluene. After 60 minutes, the reactor cell was vented and allowed to cool. The contents of the reactor cell were then removed from the glovebox and were added to rapidly stirred methanol. After 18 hours, the resulting mixture was isolated using centrifugation. The mixture was dried overnight at 60° C. and under reduced pressure. The subject reaction yielded 1.30 g of a random copolymer of ethylene and N-Vinylphthalimide with a N-Vinylphthalimide incorporation of 0.2 mol %, a weight average molecular weight, $M_w$, of 62,000 and a number average molecular weight, $M_n$, of 32,000.

We claim:

1. A process for preparing a copolymer comprising contacting at least one acyclic aliphatic olefin monomer, at least one nitrogen containing vinyl monomer, wherein the at least one nitrogen containing vinyl monomer is according to Formula (I)

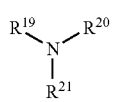
(I)

and a catalyst composition comprising a metal center, M, complexed with at least one ligand, wherein the at least one ligand has a structure according to Formula (III)

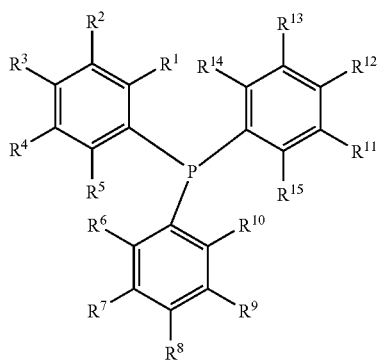
(III)

wherein $R^{19}$ is selected from —C≡C, and —C(O)—C≡C;
wherein $R^{20}$ and $R^{21}$ are independently selected from H, an alkyl group, an alkenyl group, an alkynyl group, an aryl group, a biphenyl group, a carboxylate group, a carboxyalkyl group, a carboxyarylalkyl group, an alkoxy group, an alkenyloxy group, an alkynyloxy group, an aryloxy group, an alkoxycarbonyl group, and derivatives thereof; and, wherein $R^{20}$ and $R^{21}$ may optionally be combined to form a cyclic or multi-cyclic structure;
wherein M is selected from Ni and Pd;
wherein $R^1$-$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl and silyl;
wherein at least one of $R^1$, $R^5$, $R^6$ and $R^{10}$ is a 2,6-$R^{16}R^{17}$-phenyl, where $R^{16}$ and $R^{17}$ are independently selected from hydrogen, halogen, $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl and silyl;
wherein at least one of $R^1$, $R^5$, $R^6$ and $R^{10}$ is 2,6-dimethoxyphenyl;
wherein $R^{15}$ is selected from —$SO_3$, —$PO_3$, —$AsO_3$, and —$C(CF_3)_2O$;
wherein the copolymer comprises 1 to 99.9 mol % acyclic aliphatic olefin monomer units;
with the proviso that $R^{20}$ and $R^{21}$ are not both H and with the proviso that the at least one nitrogen containing vinyl monomer is not N-vinylimidazole.

2. The process of claim 1, wherein the at least one nitrogen containing vinyl monomer is selected from N-vinylformamide; N-vinylacetamide; N-vinylphthalimide; N-methylvinylacetamide; N-vinylcaprolactam; 5-ethyl-5-methyl-3-vinylhydantoin; N-vinylpyrrolidone; 5-methyl-5-phenyl-3-vinylhydantoin; N-vinylcarbazole; N,N-dimethyl acryl amide; and 5-pentamethylene-3-vinylhydantoin.

3. The process of claim 1, wherein the branch content of those portions of the copolymer derived from acyclic aliphatic olefin monomer units exhibit a branch content of ≦15 branches/1,000 carbon atoms, wherein the branching content is determined by Carbon 13 NMR and the melting point of the copolymer.

4. The process of claim 1, wherein M is Pd.

5. The process of claim 1, wherein the at least one acyclic aliphatic olefin monomer is ethylene.

6. The process of claim 1, wherein the polymerization temperature is 0 to 200° C.

7. A process for preparing a copolymer comprising contacting at least one acyclic aliphatic olefin monomer, at least one nitrogen containing vinyl monomer and a catalyst composition comprising a metal center, M, complexed with at least one ligand, wherein the at least one ligand has a structure according to Formula (III)

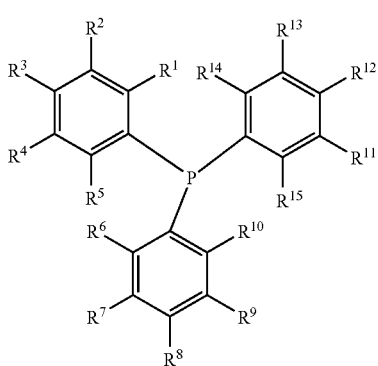
(III)

wherein M is selected from Ni and Pd;
wherein $R^1$-$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl and silyl;
wherein at least one of $R^1$, $R^5$, $R^6$ and $R^{10}$ is a 2,6-$R^{16}R^{17}$-phenyl, where $R^{16}$ and $R^{17}$ are independently selected from hydrogen, halogen, $C_1$-$C_{20}$ alkyl, $C_3$-$C_{20}$ cycloalkyl, $C_2$-$C_{20}$ alkynyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl and silyl;

wherein at least one of $R^1$, $R_5$, $R^6$ and $R^{10}$ is 2,6-dimethoxyphenyl;

wherein $R^{15}$ is selected from —$SO_3$, —$PO_3$, —$AsO_3$, and —$C(CF_3)_2O$;

wherein the at least one nitrogen containing vinyl monomer is selected from N-vinylformamide; N-vinylacetamide; N-vinylphthalimide; N-methylvinylacetamide; N-vinylcaprolactam; 5-ethyl-5-methyl-3-vinylhydantoin; N-vinylpyrrolidone; 5-methyl-5-phenyl-3-vinylhydantoin; N-vinylcarbazole; N,N-dimethyl acryl amide; and 5-pentamethylene-3-vinylhydantoin; and, wherein the copolymer comprises 1 to 99.9 mol % acyclic aliphatic olefin monomer units.

* * * * *